Aug. 21, 1956 J. MacGREGOR 2,759,597
CLINICAL THERMOMETER CASES
Filed Oct. 11, 1954
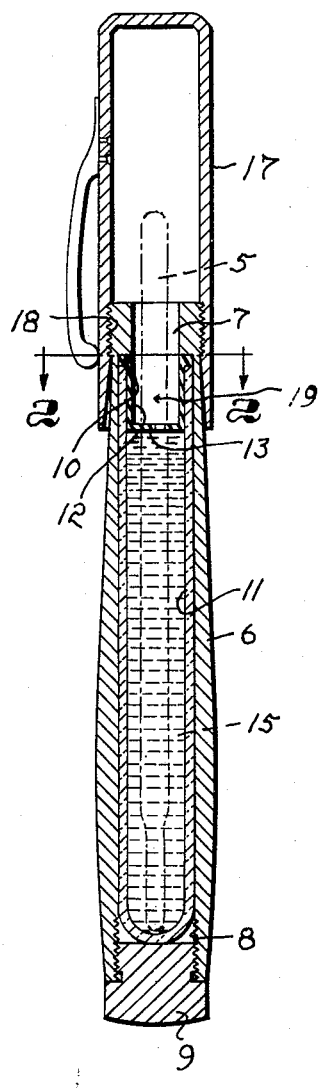
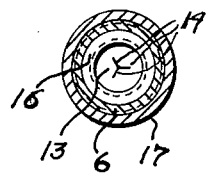
Inventor:
John MacGregor,
by Abbott Spear
Attorney

United States Patent Office 2,759,597
Patented Aug. 21, 1956

2,759,597

CLINICAL THERMOMETER CASES

John MacGregor, Needham, Mass.

Application October 11, 1954, Serial No. 461,389

1 Claim. (Cl. 206—16.6)

The present invention relates to clinical thermometer cases adapted to support their thermometers in effective contact with a sterilizing medium.

The general objectives of the invention are readily appreciated upon reference to the fact that a doctor, particularly while making his rounds of house calls, is always beset with the necessity of sterilizing his thermometers before the patient's temperature can be taken. Such sterilization represents lost time and is often attended by considerable inconvenience. There is, accordingly, a real need for a clinical thermometer case in which the thermometer is maintained sterile and which enables its sterility to be restored quickly and positively simply by placing it back in its case. Cases in accordance with the invention enable that result to be readily effected.

In the accompanying drawings, there is shown an illustrative embodiment of the invention from which other novel features, and advantages will be readily apparent. In the drawings:

Fig. 1 is a vertical section through a thermometer case in accordance with the invention, and Fig. 2 is a section taken along the indicated lines 2—2 of Fig. 1.

In the embodiment of the invention shown in the drawings, the part of the case holding the clinical thermometer 5 consists of a body 6 having a bore 7 extending from end-to-end thereof. At its bottom end, the bore 7 is threaded as at 8 to receive the plug 9 and at its upper end, its cross sectional area is decreased to provide an upwardly accessible annular shoulder 10.

A tube 11, adapted to hold liquid and conveniently of glass, has its closed end seated on the plug 9. A hollow rubber stopper 12 is disposed in the open end of the tube 11 with its transverse end wall 13 spaced below said end and aperture to resiliently receive the thermometer 5. In practice, the aperture is approximately Y-shaped, being defined by three equally spaced, radially disposed, interconnected slits 14. Such an aperture is satisfactory in that it is normally closed, but yields readily to enable the thermometer 5 to be easily inserted in or drawn out from the sterilizing liquid medium 15. While the thermometer is thus held, it plugs the aperture against leakage therethrough. The stopper 12 is shown as having an outwardly disposed marginal flange 16 which fits between the shoulder 10 and the proximate end of the tube 11. While the cap 17 may be otherwise attached to the body 6, it is shown as having a threaded connection 18 therewith.

With the tube 11 filled with a sterilizing medium, it will be apparent that the thermometer part in contact therewith is maintained sterile and protectively supported. While the aperture in the stopper wall yields readily to enable the thermometer to be withdrawn for service or inserted to have its sterility again established, it is normally closed.

When the thermometer is inserted into the liquid 15 through the stopper wall 13, some of the liquid is displaced into the pocket 19 above that wall to insure sterility of the parts thereof that come in contact with the thermometer 5.

In practice, the doctor is furnished with a series of tubes 11, each filled with the sterilizing liquid and closed by an apertured stopper 12. If desired, the stopper may be additionally sealed. The sterilizing medium is effective for a predetermined number of sterilizations and the doctor is to start each day with a fresh tube.

It will thus be apparent that thermometer cases, in accordance with the invention, enable a time taking and often inconvenient routine to be eliminated from a doctor's practice.

What I therefore claim and desire to secure by Letters Patent is:

In a thermometer case, a body having a bore extending from end-to-end thereof but with its upper end of reduced cross sectional area thus to provide an upwardly accessible, internal shoulder, a tube closed at its bottom end and adapted to hold sterilizing liquid and including a hollow rubber stopper in its upper end provided with a transverse end wall spaced below that end and having a slit to snugly receive the thermometer thrust therethrough for entry into the liquid, said stopper also including an outwardly disposed marginal flange overlying the open end of said tube, and a plug closing the bottom end of said bore and anchoring said tube with said flange seated against said shoulder.

References Cited in the file of this patent

UNITED STATES PATENTS

| 824,038 | Myers | June 19, 1906 |
| 1,095,854 | Gray | May 5, 1914 |
| 1,145,675 | Dudley | July 6, 1915 |
| 1,216,827 | MacGregor | Feb. 20, 1917 |
| 1,516,689 | Rook | Nov. 25, 1924 |
| 2,494,456 | Still | Jan. 10, 1950 |